United States Patent [19]

Maki et al.

[11] 4,153,506

[45] May 8, 1979

[54] METHOD OF STARTING OPERATION OF A NUCLEAR REACTOR

[75] Inventors: Hideo Maki, Katsuta; Takanori Hosokawa, Hitachi; Katsutoshi Shinbo, Katsuta, all of Japan

[73] Assignee: Hitachi, Ltd., Japan

[21] Appl. No.: 723,065

[22] Filed: Sep. 14, 1976

[30] Foreign Application Priority Data

Sep. 17, 1975 [JP] Japan .................. 50-111629

[51] Int. Cl.² .............................................. G21C 7/06
[52] U.S. Cl. ..................... 176/20 R; 176/22
[58] Field of Search ........ 176/19 R, 20 R, 22, 176/24, 38, 50, 73, 74

[56] References Cited

U.S. PATENT DOCUMENTS

| | | | |
|---|---|---|---|
| 3,926,721 | 12/1975 | Lysell | 176/19 R |
| 4,057,466 | 11/1977 | Thompson et al. | 176/38 |

OTHER PUBLICATIONS

Nuclear Engineering Handbook, Etherington, McGraw Hill Book Co., (N.Y.) (1958) pp. 8-29-8-31.

Primary Examiner—Samuel W. Engle
Assistant Examiner—S. A. Cangialosi
Attorney, Agent, or Firm—Craig & Antonelli

[57] ABSTRACT

A method of starting operation of a nuclear reactor which contains fresh fuel rods comprising increasing a fuel power P(Kw/ft) produced by the fresh fuel rods to an amount determined by the following inequality;

$$P < 366 \times (G/D) - 1.38,$$

where D is a diameter of a fuel pellet of the fresh fuel rod and G is an initial gap between a fuel cladding of the fresh fuel rod and the fuel pellet, maintaining the fuel power at the amount for a predetermined period and thereafter increasing the fuel power to a desired maximum power level.

10 Claims, 5 Drawing Figures

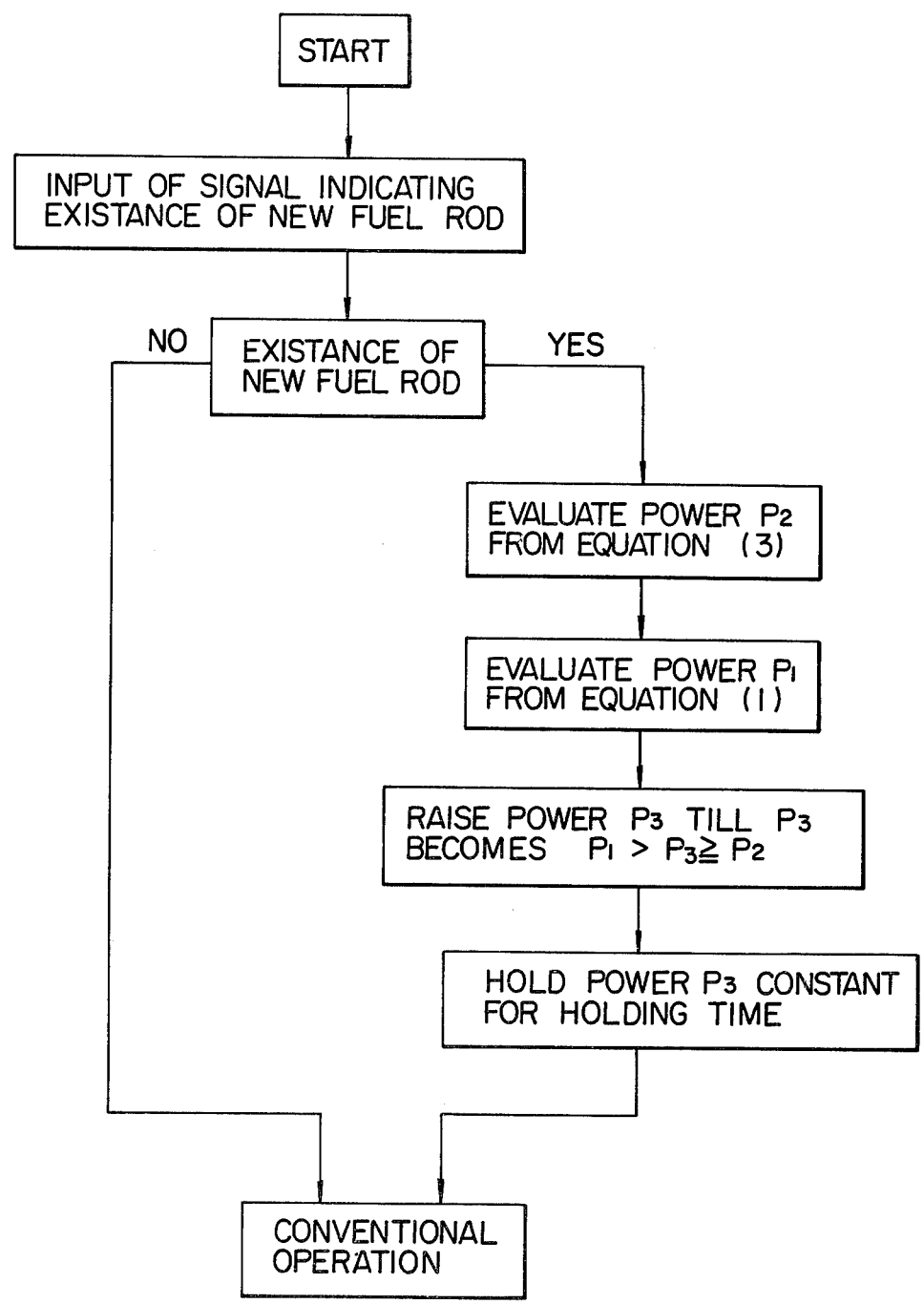

METHOD OF STARTING OPERATION OF A NUCLEAR REACTOR

BACKGROUND OF THE INVENTION

The present invention relates to a method of starting operation of a nuclear reactor having fresh fuel rods of the type containing nuclear fuel covered with fuel rod claddings. (The term "fresh fuel rod" is utilized herein to designate a fuel rod which has not been irradiated or used.)

In a nuclear reactor of the water cooling type or water moderating type reactor including a Boiling Water Reactor or a Pressurized Water Reactor, fuel elements consisting of a plurality of fuel rods are grouped together in a reactor core. The fuel rod comprises an elongated tubular cladding and a column of sintered fuel pellets piled up in the cladding. The fuel pellet is usually made of a suitable fuel, such as uranium oxide. The tubular cladding is formed of a suitable metal, such as zirconium alloy known as Zircaloy. The cladding is sealed by end plugs to isolate the nuclear fuel from the coolant-moderator and to prevent the release of fission products. In the upper portion of the cladding, a gas plenum is provided to collect fission product gases. The inner surface of the cladding is coated with a suitable corrosion resistance oxide film. The diameter of the pellet is less than the inside diameter of the cladding to provide an initial circumferential gap.

After installation of the pellets in the cladding, the fuel rod is dehydrated to remove residual moisture included in the pellets under a vacuum condition below $10^{-2}$ mmHg at a temperature about 400° C. for about three hours. Further, in the gas plenum in fuel rods, there is usually provided a material suitable for controlling moisture by chemically combining with water and water vapor, a so-called getter, as shown for example in U.S. Pat. No. 3,742,367.

It is known that the pellets are easily expanded in such a way so as to assume an hour-glass configuration after irradiation of the fuel rods due to the temperature difference between the axis and the periphery of the pellets. Usually, the temperature of the axis of the pellets is higher than that of the periphery. When the amount of the expansion of the pellets increases, the periphery of the pellets contacts the surface of the claddings, (This phenomenon is hereafter called "pellet-cladding interaction" or "interaction".), which causes the deformation of the claddings in such a way as to assume a joint of bamboo.

The cladding which is usually made of Zircaloy reacts with $H_2O$ to generate hydrogen in the fuel rods. The Zircaloy absorbs hydrogen to cause localized hydriding of the cladding, so that, as described before, the inner surface of the cladding is usually coated with a suitable corrosion resistance oxide film to prevent the absorption of the hydrogen. However, the oxide coating easily comes off due to the interaction between the pellets and the claddings to reveal the inner surface of the claddings. Further, the pellets are also easily broken or cracked along the radial direction after the irradiation, and there appears a large partial stress at a portion on the cladding contacted by the cracks of the pellets, which causes cracks even on the cladding.

The efficiency of the hydrogen absorption in Zircaloy-2 at a temperature of 350° C. is seventy times as large as that in Zircaloy-2 with the corrosion resistance oxide coating. As described before, in the portion where the corrosion resistance oxide coating is cracked, the hydrogen is absorbed in concentration into the claddings and the hydride localization may cause great damage to the fuel rods.

In a conventional method for eliminating the above defects due to hydride localization, a moisture getter is interposed within the claddings. However, it is possible that the hydride localization is caused before the getter comes into full operation to absorb the moisture. Further, the interaction may make it impossible to flow the hydrogen exhausted from the pellets into the getter arranged in the upper portion of the fuel rods, because the hydrogen exhausted from the pellets is captured in a space surrounded by the contacting portions of the pellets and the claddings within the gap, which may cause hydride localization at lower portions of the fuel rods.

In a conventional method of starting operation, it has been believed that no failures of the claddings appear during the starting operations below a power level of 8 Kw/ft, because the pellet-cladding interaction occurs above a power level of 8 Kw/ft or in a power range of 6 to 10 Kw/ft and above, which is shown in U.S. patent application Ser. No. 460,298 by John R. Thompson et al. Therefore, there have been no provisions for the starting operation of the reactor below such fuel power level, that is, in the conventional starting operation, the fuel power is abruptly increased to reach 8 Kw/ft and thereafter gradually increased to a desired maximum power level of the reactor at a rate below a critical rate which would cause cladding damages. However, it has recently been found that there is a danger of occurrence of cladding damage below the power level of 8 Kw/ft, and this phenomenon is especially notable in a case when fresh fuel rods are installed in the reactor.

SUMMARY OF THE INVENTION

An object of the present invention is to provide a method of starting operation of a nuclear reactor, in which fresh fuel rods are installed, without causing fuel rods failures.

The present invention is based upon the discovery that when fresh fuel rods are installed in a reactor, failures of the fresh fuel rods can occur at a power level below 8 Kw/ft. According to the present invention, to eliminate the failures of the fresh fuel rods at the starting operation, the fuel power produced by the fresh fuel rods is kept below an amount of fuel power level, which causes an interaction between the pellets and claddings in the fresh fuel rods due to an expansion of the pellets, and thereafter the fuel power is increased to a desired maximum power level of the nuclear reactor.

BRIEF DESCRIPTION OF THE DRAWINGS

FIG. 5 is a block diagram of a calculating system of the present invention.

DESCRIPTION OF THE PREFERRED EMBODIMENTS

Figure 1:
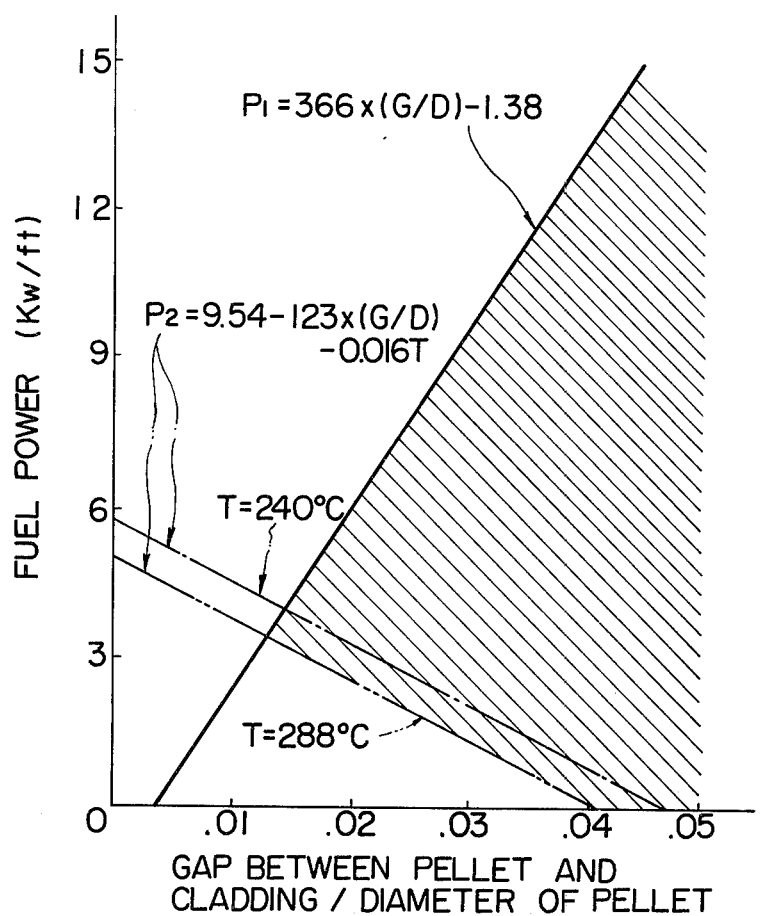
FIG. 1 is a graph showing a relation between fuel power in which interactions between the pellets and claddings appear, and a ratio of the gap between the pellets and claddings, and the diameter of the pellets.

Referring to FIG. 1, there is illustrated one example of a fuel power region in which an operation of a nuclear reactor is preferably started without causing pellet-cladding interactions in the fuel rods. For the type of reactor under discussion, the pellets are for example about 12.4 mm in diameter in a 7 × 7 array of spaced fuel rods, and 10.6 mm in a 8 × 8 array of spaced fuel rods. The initial diametral gap is about 0.3 mm for the 7 × 7 array, and 0.23 mm for the 8 × 8 array.

The solid line shows an experimental result of an upper limit of the fuel power level, above which the periphery of the pellet expands to contact the inner surface of the cladding by the expansion of the pellets. The upper limit of the fuel power level $P_1$ can be expressed approximately by the following equation (1).

$$P_1 = 366 \times (G/D) - 1.38 \qquad (1)$$

in which G is an initial circumferential gap (diametral gap) between the pellet and cladding, D is the diameter of the pellet, and the dimension of of the fuel power P is Kw/ft.

When the fuel power reaches a power level determined by the equation (1), the pellets deform to contact the inner surface of the claddings and is capable of causing cracks in the corrosion resistance coating on the inner surface of the cladding. According to one embodiment of the present invention, the operation of the reactor is started within a fuel power level P determined from the following inequality (2), that is, $$P < 366 \times (G/D) - 1.38 \qquad (2)$$

The fuel power is kept at this power level P for a certain period of time which is long enough to dehydrate the pellet to remove the moisture contained in the fuel rods.

Further, it is necessary to dehydrate the moisture as fast as possible so that the reactor can be operated at a desired maximum power level within a short period. As the dehydration of the pellets is promoted at a temperature of the surface of the pellet more than about 400° C., it is necessary to increase the fuel power to heat the pellet above 400° C. The single dot-dash line and the double dot-dash dotted line in FIG. 1 show the lower fuel power limits in which the surface of the pellets is heated more than 400° C., respectively at temperatures of the coolant water of 240° C. and 288° C. Both the single and double dot-dash lines can be approximately expressed by the following equation (3), that is, $$P_2 = 9.54 - 1.23 \times (G/D) - 0.016\, T \qquad (3)$$

in which T is the temperature of the coolant water surrounding the fuel rods, and $P_2$ is a lower power limit in which the temperature of the surface of the pellets becomes greater than 400° C.

Therefore, it is preferable to increase the fuel power P to satisfy the following inequality;

$$P \geq 9.54 - 1.23 \times (G/D) - 0.016\, T \qquad (4)$$

Figure 2:
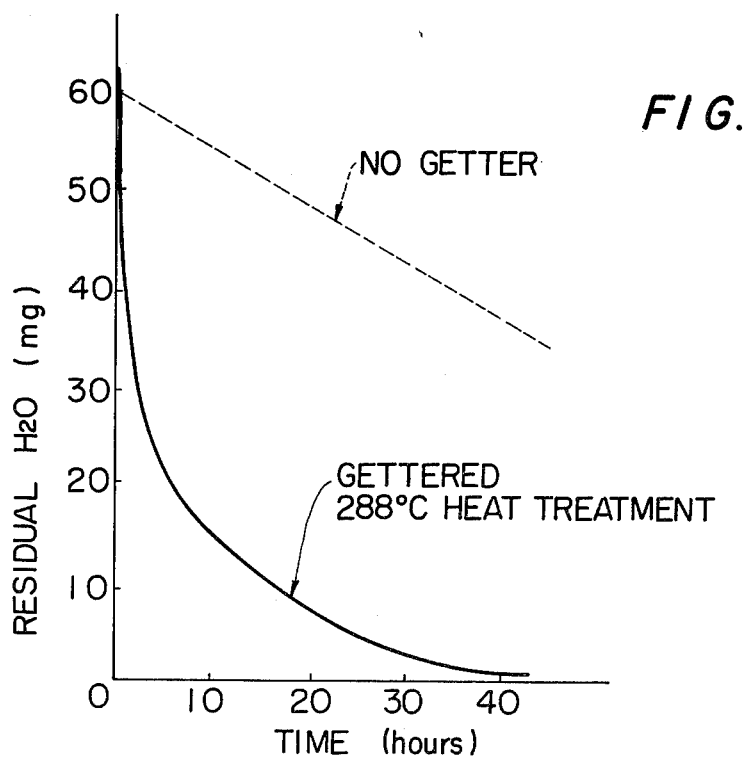
FIG. 2 is a graph showing a relation between the holding time and the residual $H_2O$ in the fuel rods.

Referring to FIG. 2, there is illustrated an experimental result of $H_2O$ adsorbing efficiency of a getter interposed in a fuel rod, and also illustrated an experimental result without a getter. In these experiments, 60 mg of $H_2O$ was adopted in a fuel rod and the fuel rod was circumferentially cooled at a temperature of 288° C. As apparent from the solid line in FIG. 2, the residual $H_2O$ in the fuel rod decreases to 10 mg after 15 hours heat treatment. It is known that 2 mg of $H_2O$ per 1 $mm^3$ of open space in the fuel rod is sufficient to cause hydride damage to the claddings. This residual amount of 10 mg $H_2O$ is one twelfth (1/12) of the amount sufficient to cause hydride localization in the fuel rods, and therefore about 15 to 20 hours are enough to make the residual $H_2O$ absorbed into the getter interposed in the fuel rod. Accordingly, in the starting operation of the present invention, 15 to 20 hours are sufficient for the holding time, in which the fuel power is kept between the power levels determined by the equations (1) and (3).

It is preferable to make the holding time as short as possible to operate the reactor efficiently, so that, it is also preferable to operate the reactor at the highest power level within that region to release the residual $H_2O$ from the pellets.

Figure 3:
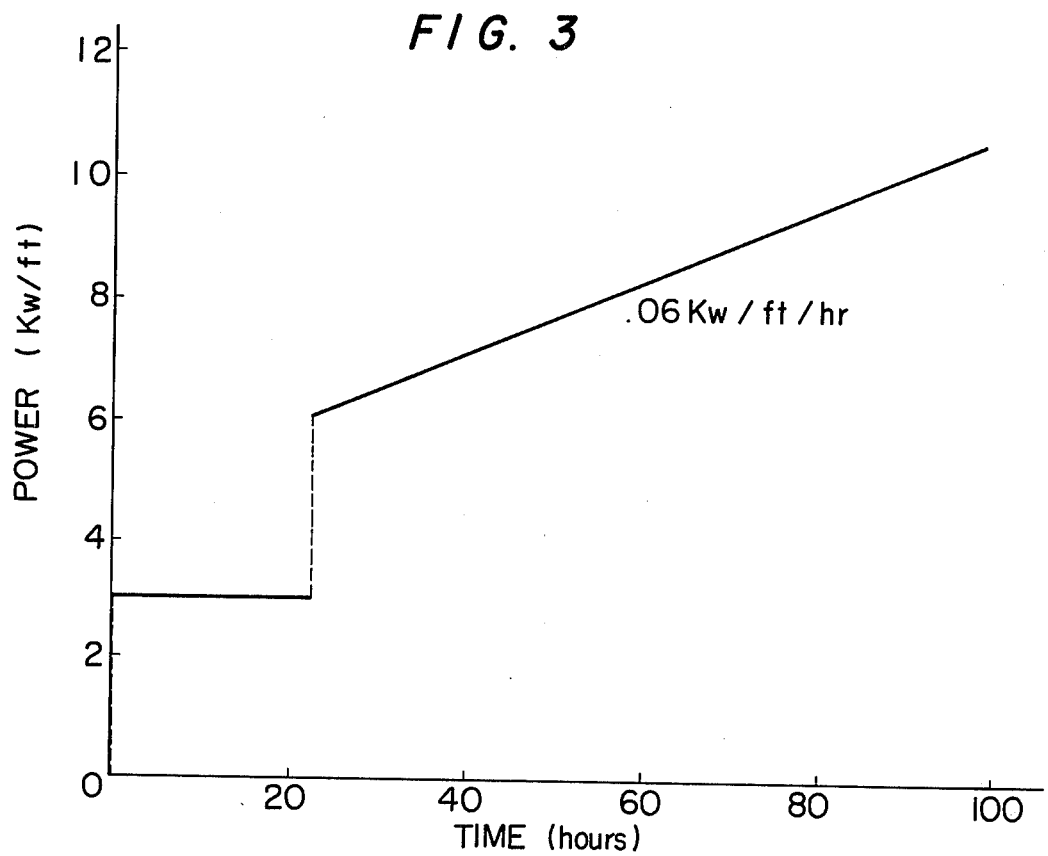
FIG. 3 is a power versus time curve of one embodiment of the present invention.

Referring to FIG. 3, there is illustrated one embodiment of the starting operation of the present invention. In this embodiment, the diameter of the pellets is 10.6 mm, the diametral gap between the pellets and claddings is 0.23 mm and the temperature of the coolant is 288° C. Therefore, the upper limit of the fuel power $P_1$ is determined from the equation (1); $P_1 = 6.56$ Kw/ft, and the lower limit of the fuel power $P_2$ is also determined from the equation (3); $P_2 = 2.26$ Kw/ft. In this embodiment, the fuel power is increased at a relatively rapid rate until about 3 Kw/ft and which power level is kept constant for about 20 hours. After 20 hours, the power level is abruptly increased to about 6 Kw/ft which amount is sufficient not to cause the interactions and is thereafter increased to a maximum desired power level at a rate of 0.06 Kw/ft/hour.

It is not always necessary to maintain the starting power level P constant for the holding time, that is, the starting power level can be varied for the predetermined holding time within the power levels determined from the equations (1) and (3).

Figure 4:
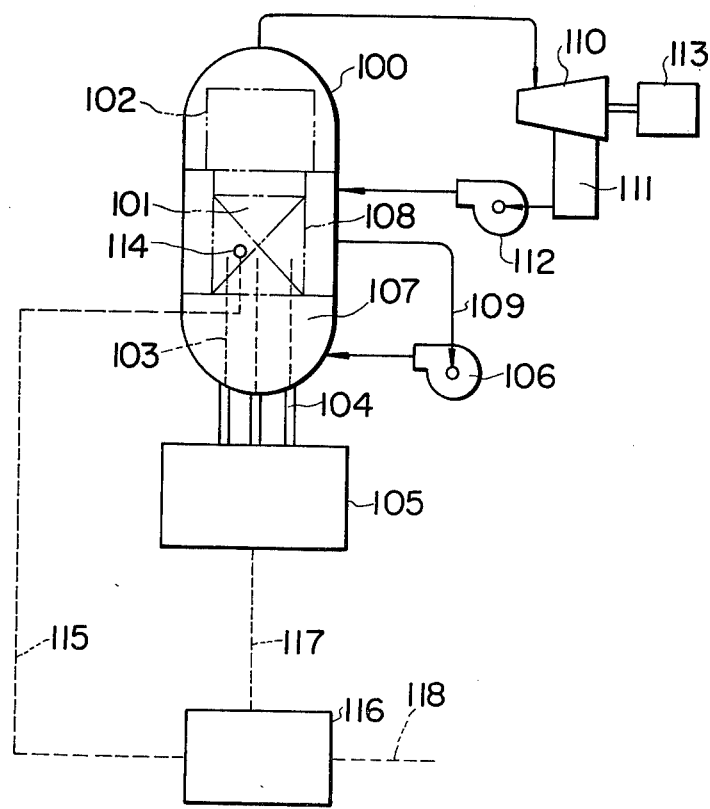
FIG. 4 is a schematic illustration of a nuclear reactor system of the present invention.

A typical power plant of Boiling Water Reactor, in which the present invention can be applied, is schematically illustrated in FIG. 4. A pressure vessel 100 contains a nuclear fuel core 101 and a steam separating and drying apparatus 102. A plurality of control rods 103 may be reciprocated by drive devices 104 into and out of the core 101 to control the reactivity of the reactor. A rod control system 105 controls the operation of the control rod drive device 104.

The vessel 100 is filled with a coolant to a level somewhat above the core 101. The coolant is circulated through the core 101 by a circulation pump 106 through a pipe 109 which receive the coolant from a fuel core shroud 108 and forces it into a plenum 107 from which the coolant flows upward through the fuel assemblies of the reactor core. The heat produced by the fuel elements is thereby transferred to the coolant and a head of steam is produced in the upper portion of the vessel 100. The steam is applied to the turbine 110 to drive an electric generator 113. The turbine exhausts to a condenser 111 and the resulting condensate is returned as a feed water to the vessel 100 by a feed water pump 112.

A neutron detector 114 is provided in the fuel core 101 to detect the power produced by the fuel elements. The detected signal produced in the neutron detector is transferred through a circuit 115 to a calculating system 116. The calculating system 116 and the rod control system 105 are connected by a circuit 117. The calculating system 116 begins to operate according to a signal indicating the use of fresh fuel rods through a circuit 118. When a signal indicating an installation of fresh fuel rods in the reactor is applied to the calculating system 116 through the circuit 118, the calculating system 116 begins to operate in accordance with the flow chart illustrated in FIG. 5.

The calculating processes in the calculating system 116 will be explained in detail with reference to FIG. 5. At a starting operation of the reactor in which fresh fuel rods are installed in the fuel core 101, a signal indicating an existence of the fresh fuel rods is manually applied through the circuit 118 to the calculating system 116. This signal input step needs to be completed at least before the starting operation of the reactor. In the calculating circuit, a judgment of the existence of new fuel rods is made, that is, when the new fuel rods are installed in the reactor, subsequent steps in the direction of "YES" are followed. On the other hand, when no new fuel rods are installed in the reactor, a conventional starting operation is employed.

When the new fuel rods are installed in the reactor, the fuel power $P_2$ is evaluated in accordance with the equation (3). The values of the inside diameter of the fuel pellet D, and the initial circumferential gap G between the pellet and the cladding are applied beforehand to the calculating system 116. The coolant temperature is detected by a temperature detector for example thermocouples (not shown) arranged in the fuel core 101 and the value of the coolant temperature is also applied as an input to the calculating system 116. After completing the evaluation of the fuel power $P_2$, the fuel power $P_1$ is evaluated in accordance with the equation (1). The fuel power P, which is in proportion to the output power of the reactor detected by the neutron detector 114 is raised within a power range determined by the detected values of the fuel power $P_1$ and $P_2$ to satisfy the following inequality;

$$P_1 > P \geq P_2$$

When the fuel power is raised up to reach P, the fuel power is held at a constant value P for a certain holding time. During the holding time, moisture contained in the fresh fuel rods is absorbed in the getter installed within the fuel rods. After completion of the absorption, the fuel power P is then raised in accordance with the conventional operating method.

As is readily apparent to those skilled in the art, the type of the rod control system 105 and the calculating system 116 are chosen from structures available in the art of the nuclear power control, for example, of the type disclosed in U.S. Pat. No. 3,565,760 which describes in more detail the calculating system 116 of the present invention.

As is apparent from this disclosure, the region of the fuel power level in which the starting operation is preferred is not limited to the FIG. 1 illustration or the equations (1) and (3), because the upper and the lower power limits differ in accordance with the material used as the fuel pellets or the claddings. It is to be noted that, the feature of the present invention is that, the fuel power level at the starting period of the reactor having fresh fuel rods is maintained below a power level in which no interaction appears in the fresh fuel rods.

This invention can be applied even to a starting operation of a nuclear reactor in which fresh fuel rods are installed without the corrosion resistance coating on the inner surface of the claddings.

In the conventional method of starting operation, the residual moisture or hydrogen included in the fuel rods would be captured in a narrow space surrounded by the contact portions of the pellets and claddings within the gap, which may cause the localized hydriding of the fuel rod. However, according to the present method, the residual moisture or hydrogen in the fuel rods is removed before the appearance of the interaction between the pellets and claddings.

In the above description, a Boiling Water Reactor is employed for explanation purposes, but this invention can be applied to any other type of reactors which employ nuclear fuel pellets covered with fuel rod claddings.

According to the features of the present invention, fuel rod failures can be eliminated by removing the residual moisture before the appearance of the interaction. As a result of the elimination of the fuel rod failures, a safe and efficient starting operation of the nuclear reactor can be obtained.

It is understood that the present invention is not limited to the specific features described herein but also contemplates numerous changes and modifications as would be known to those skilled in the art given the present disclosure of the invention, and we therefore do not wish to be limited to the details shown and described herein only schematically, but intend to cover all such changes and modifcations.

We claim:

1. A method of starting operation of a nuclear reactor in which fresh fuel rods are installed of the type having a plurality of cylindrical oxide pellets and a moisture getter enclosed in an elongated tubular cladding of a zirconium alloy comprising:

a first step of increasing fuel power produced by the fuel rods to a fuel power amount below an amount which causes an interaction between the pellets and the claddings in the fuel rods, a second step of maintaining the fuel power amount below the interaction amount for a predetermined period, and a third step of increasing the fuel power amount to a desired maximum power level of the nuclear reactor after the predetermined period.

2. The method according to claim 1, wherein the fuel power amount in the first step is greater than an amount which is large enough to heat the surface of the pellets to remove residual $H_2O$ from the fuel rods.

3. The method according to claim 2, wherein the fuel power amount in the second step is kept constant below the amount which causes an interaction between the pellets and the claddings in the fuel rods for the predetermined period.

4. The method according to claim 3, wherein the predetermined period is a sufficient period to remove the residual $H_2O$ from the fuel rods.

5. The method according to claim 4, wherein the fuel power amount P(Kw/ft) in the first step is smaller than an amount $P_1$(Kw/ft) determined from an equation;

$$P_1 = 366 \times (G/D) - 1.38,$$

where D is a diameter of the pellets and G is a diametral gap between the cladding and the pellet.

6. The method according to claim 5, wherein the fuel power amount P(Kw/ft) in the first step is larger than an amount $P_2$(Kw/ft) determined from an equation;

$$P_2 = 9.54 - 123 \times (G/D) - 0.016\, T,$$

where T is a temperature °C. of coolant surrounding the fuel rods in the reactor.

7. The method according to claim 1, wherein the fuel power amount P(Kw/ft) in the first step is determined by the inequality $$P_1 > P \geqq P_2$$

where $P_1 = 366 \times (G/D) - 1.38$ and D is the diameter of the pellets and G is a diametral gap between the cladding and the pellet, and where $P_2 = 9.54 - 123 \times (G/D) - 0.016\, T$ and T is a temperature °C. of coolant surrounding the fuel rods in the reactor.

8. The method according to claim 7, wherein the fuel power amount P is maintained at a constant level for the predetermined period in the second step.

9. The method according to claim 8, wherein the predetermined period in the second step is a sufficient period of time to remove the residual $H_2O$ from the fuel rods.

10. The method according to claim 1, wherein the first and second steps are effected so as to sufficiently absorb moisture into the moisture getter to minimize fuel rod damage due to hydride localization.

* * * * *